United States Patent Office 2,811,418
Patented Oct. 29, 1957

2,811,418

PURIFICATION OF GERMANIUM TETRACHLORIDE

Henry C. Theuerer, New York, N. Y., assignor to Bell Telephone Laboratories, Incorporated, New York, N. Y., a corporation of New York No Drawing. Application March 20, 1952, Serial No. 277,735

1 Claim. (Cl. 23—87)

This invention relates to improved methods of purifying germanium tetrachloride. More particularly this invention relates to improved methods of purifying germanium tetrachloride by extraction with hydrochloric acid and an oxidizing agent, resulting in the production of material usable in the manufacture of semiconductive devices such as varistors and transistors.

Although, according to present day theory, the semiconductive properties of a material such as germanium depend upon the presence of a certain minimum amount of significant impurity, there has never been any difficulty in maintaining this minimum amount since no process sufficiently efficient to remove this minimum has yet been devised. One of the problems to be overcome in the production of semiconductive devices is the purification of the material to the end that a high resistivity, high purity substance be produced which may then be submitted to the various solute distribution processes necessary in the production of the final semiconductor device. It is generally not feasible to use as a starting material for the final processes germanium containing more than one part of impurity to about one million parts of germanium. This invention is directed to an economical means for producing the starting material.

There are two stages in the production of germanium semiconductive devices at which it is economically feasible to conduct a purification process such as will herein be described. The first is in the treatment of the crude germanium-containing material. The second is in the recovery of scrap germanium resulting from the manufacture of the germanium wafer. In the latter stage the material is recoverable either in the form of impure end portions of the ingot or in the form of a sludge which latter must be repurified before further use.

The purification procedure now in use for the large scale commercial manufacture of germanium ingots for use in transistor and rectifier production, involves several distillations of germanium tetrachloride in the presence of chlorine. The germanium tetrachloride is usually produced by the burning of the germanium material in chlorine. Although multiple distillation of the crude germanium tetrachloride in the presence of hydrochloric acid and chlorine in a packed fractionating column is adequate to effect purification of the material, the procedure is highly complex and uneconomical.

In order to circumvent the necessity of multiple distillations, investigations have been conducted with a view to developing an extraction method for the removal of the impurities from the germanium tetrachloride. Such extractive processes were described in an article by Allison and Muller on page 2833 of the July 1932 issue of the Journal of the American Chemical Society. The conclusion of this article is since germanium tetrachloride has a very low solubility in a concentrated aqueous hydrochloric acid solution and since the chlorides of the impurities usually found in the germanium, especially that of arsenic, have a higher solubility in the acid layer than in the germanium tetrachloride layer, that therefore a satisfactory extraction may be carried out in the presence of this medium. The present invention is directed toward increasing the proportion of this arsenic extracted by the hydrochloric acid layer in such a process.

In short, the process of the present invention comprises agitating germanium tetrachloride together with hydrochloric acid saturated with an oxidizing agent such as chlorine, allowing the mixture to settle into two layers and separating the two layers by draining off the heavier germanium tetrachloride layer. The germanium tetrachloride may be obtained either from a supplier or by burning scrap germanium in chlorine in an appropriate silica vessel. After the extraction process has been repeated one or more times, using fresh hydrochloric acid and chlorine for each separation, the germanium tetrachloride is hydrolyzed to germanium dioxide. The product is of a purity equivalent to that produced by the distillation process.

It is well known that after the chlorination of the germanium to produce germanium tetrachloride, that impurity the removal of which offers the greatest difficulty is arsenic since the chloride of this element, unlike that of the other impurities commonly found in the crude germanium-containing material, is of a volatility of the range of that of the germanium tetrachloride itself. The efficiency of any satisfactory extraction process, therefore, depends on causing the arsenous chloride resulting from chlorination to go into solution in the acid layer. According to Allison and Muller, the distribution coefficient of arsenous chloride between the hydrochloric acid and germanium tetrachloride layers, approaches a maximum only slightly higher than 1; that is to say, the arsenous chloride is only slightly more likely to go into the acid layer than to remain in the tetrachloride layer. According to the process of the present invention, this distribution coefficient is improved by converting the arsenic trichloride (arsenous chloride) to arsenic acid by the following reaction:

$$AsCl_3 + 4H_2O + Cl_2 \rightarrow H_3AsO_4 + 5HCl \qquad (1)$$ 

It is believed that this is the reaction that takes place in the aqueous acid layer of the present invention and that no appreciable amount of arsenic pentachloride is produced in a tetrachloride layer. However, it is to be understood that this invention description and claims thereof are not to be so limited. In this process the arsenous chloride in the germanium tetrachloride is transferred to the aqueous hydrochloric acid where it hydrolyzes to arsenous acid which is converted to arsenic acid by the chlorine there present, the resulting arsenic acid remains in the aqueous layer which is mechanically separated from the germanium tetrachloride.

The method just described is essentially a batch process in which a fixed quantity of germanium tetrachloride is given successive treatments in chlorine saturated hydrochloric acid. The method, however, is also adaptable to continuous extraction processes such as are well known to the art. For example, germanium tetrachloride can be introduced at the top of a packed column through which an upward flow of chlorine saturated hydrochloric acid is maintained. As the germanium tetrachloride percolates down the column, continuous exposure to fresh hydrochloric acid extracts the arsenous chloride which latter is converted to the pentavalent acid by the chlorine present in the hydrochloric acid. In this system pure germanium tetrachloride leaves the bottom of the column and the spent acid emerges at the top.

The following is offered as an example illustrative of the manner in which the process of this invention may be carried out.

Example

A one-pound charge of scrap germanium containing a minimum of 0.1 percent each of aluminum, gallium, arsenic, antimony, boron and silicon was prepared. This charge was chlorinated by heating it within a silica vessel through which a flow of chlorine was maintained. As the temperature increased, the germanium ignited and burned spontaneously, the reaction being controlled by adjusting the rate of chlorine flow. The germanium tetrachloride formed in this reaction was passed into a condenser and the liquid was collected in a distillation flask. The reaction was discontinued when 300 milliliters of germanium tetrachloride were obtained. After removing a 50-milliliter sample, 12 normal hydrochloric acid saturated with chlorine was added to the remainder, the ratio of acid to germanium tetrachloride being about 40 percent by volume. The mixture was then thoroughly agitated in a separatory funnel and allowed to settle into two layers for about 45 minutes after which the heavier germanium tetrachloride was drawn off. This process was repeated eight times, 50-milliliter samples being removed after the second, fourth and eighth extractions. All samples were then hydrolyzed to germanium dioxide and subsequently reduced to germanium for testing by resistivity measurements.

The data indicated that after four extractions approximately the same purity is obtained as with the column distillation method and that further extractions did not seem to appreciably improve the material. The resistivity of the end product after the fourth extraction was in the neighborhood of about 6 ohm-centimeters which corresponds to an impurity level of arsenic of about one part of arsenic to about ten million parts of germanium. This material is of greater purity than that normally used as a feed material in the final solute distribution processes preparatory to the production of semiconductive devices.

Although the process thus far has been described in terms of extraction in the presence of aqueous hydrochloric acid saturated with chlorine as an oxidizing agent, many other oxidizing agents known to the art will be found satisfactory in place of the chlorine. The prime requisite of the agent chosen is that it have a sufficiently high potential necessary to take the arsenous acid over to the pentavalent acid $H_3AsO_4$. This potential read from the Standard Oxidation Reduction Potentials table of the "Handbook of Chemistry and Physics," 31st edition, page 1442, is −0.49 volts. Consequently, any oxidizing agent having at least this potential will be operative. It is desirable that the oxidizing agent chosen be fairly soluble in the aqueous hydrochloric acid since otherwise it would be necessary to bubble it through the layer. Consequently, due to the high volatility of germanium tetrachloride, resulting in some loss of the latter, it is further preferable that the agent chosen not react with germanium tetrachloride so as to bring the resulting compound into the aqueous layer. If the agent chosen reacts with the germanium tetrachloride but does not bring it into the aqueous layer, this is not objectionable providing the resulting compound can later be hydrolyzed along with the germanium tetrachloride.

It has been found preferable to use about a 12 normal solution of hydrochloric acid, since if the concentration is much reduced an appreciable amount of the germanium tetrachloride will hydrolyze and remain in the aqueous layer. With lower concentrations of hydrochloric acid the extraction process becomes less and less efficient. In no event must a solution of less than about 8 normal be used. Although it is possible to increase the concentration of the aqueous hydrochloric acid solution by operating under pressure, the resulting improvement in separation is so slight as not to merit the additional expenditure. The upper limit on the hydrochloric acid concentration, therefore, is simply a matter of economics since the theoretical separation will be better and better as the concentration of the acid solution is increased. It should be noted, however, that as the concentration of the hydrochloric acid solution is decreased the chlorine concentration at saturation increases. The improvement thereby realized, however, is far outweighed by the increased solubility of the germanium tetrachloride at lower concentrations.

Since the efficiency of the separation depends on the presence of two volatile substances, that is, the germanium tetrachloride and the chlorine, it is most satisfactory to operate at reduced temperatures. Subjecting the whole apparatus to an ice bath is profitable since it reduces the loss of germanium tetrachloride through evaporation and further since the reduced temperature results in a higher solubility of chlorine in the acid layer.

It should be noted that since the amount of arsenic present in the starting material and the amount of the resulting arsenic acid formed in the hydrochloric acid solution is so slight, consideration given to increasing the solubility of the arsenic acid in this layer, though varying with the operating conditions, is not critical since with the material intended to be used saturation is never approached.

The invention has been described in terms of its specific embodiments and since modifications and equivalents will be apparent to those skilled in the art, this description is intended to be illustrative of, and not to constitute a limitation upon, the scope of the invention.

What is claimed is:

A process of purifying germanium tetrachloride containing arsenic as an impurity comprising at least once agitating the said germanium tetrachloride and 12 normal aqueous hydrochloric acid saturated with chlorine, allowing the mixture to settle into two layers and subsequently recovering purified germanium tetrachloride from the heavier layer the above operations being performed at a reduced temperature.

References Cited in the file of this patent

UNITED STATES PATENTS

| | | |
|---|---|---|
| 875,558 | Skinner | Dec. 31, 1907 |
| 2,576,267 | Scaff et al. | Nov. 27, 1951 |

OTHER REFERENCES

Journal of the Amer. Chem. Soc., vol. 54 (1932), pages 2833–2840, article by E. R. Allison and Muller.

"Baker Analyzed Reagents," Jan. 1, 1935, page 5.